United States Patent [19]
Lybeer et al.

[11] Patent Number: 5,715,300
[45] Date of Patent: Feb. 3, 1998

[54] METHOD FOR ESTABLISHING DATA CONNECTIONS IN AN AUXILIARY EXCHANGE COMMUNICATIONS INSTALLATION

[75] Inventors: Roger Lybeer, Destelbergen; Walter Schallier, Gent, both of Belgium

[73] Assignee: Siemens Aktiengesellschaft, Munich, Germany

[21] Appl. No.: 325,463

[22] PCT Filed: Apr. 19, 1993

[86] PCT No.: PCT/DE93/00341

§ 371 Date: May 8, 1995

§ 102(e) Date: May 8, 1995

[87] PCT Pub. No.: WO93/22884

PCT Pub. Date: Nov. 11, 1993

[30] Foreign Application Priority Data

Apr. 30, 1992 [DE] Germany .................. 9205844 U

[51] Int. Cl.[6] .................................. H04M 11/00
[52] U.S. Cl. .................................. 379/94
[58] Field of Search .................. 379/94, 93, 97, 379/98; 375/222

[56] References Cited

U.S. PATENT DOCUMENTS

| 4,953,199 | 8/1990 | Hoshi et al. ................. 379/93 |
| 4,998,248 | 3/1991 | Matsuzaki .................... 379/94 |
| 5,153,897 | 10/1992 | Sumiyoshi et al. ........... 379/97 |
| 5,414,760 | 5/1995 | Hokari ......................... 379/94 |

FOREIGN PATENT DOCUMENTS

| 0500450 | 8/1992 | European Pat. Off. . |
| 3827493 | 2/1990 | Germany . |
| 4120045 | 4/1992 | Germany . |

OTHER PUBLICATIONS

NTZ—Nachrichtentechnische Zeitschrift 41 (1988) Mar., No. 3, Berlin, W.Germany, ISDN—Kommuniketionssysteme, "Technik und Leistungsmerkmale einer ISDN-T-K-Anlage", Peter Kroeger, pp. 144–148.

TN Nachrichten (1987) No. 91, Frankfurt/W. Germany, "D-Kanal-Protokolle im ISDN und ihre Bedeutung Für die Kommunikation", Reinald Quintenz et al, pp. 41–47.

Special Issue telcom report and Siemens Magazine COM, Dec. 1985, Siemens Aktiengesellschaft, "ISDN in the Office—HICOM, Technology and Applications of the HICOM ISDN Communication System", pp. 4–72.

Primary Examiner—Wing F. Chan
Attorney, Agent, or Firm—Hill, Steadman & Simpson

[57] ABSTRACT

In order to establish data links between differently structured subscriber stations, a central modem (modem pool) is inserted. When setting up connections for which a central modem is to be inserted, service indicator information in conformity with the relevant ISDN protocol is formed which designates the service implemented on the destination side by the inserted modem.

2 Claims, 3 Drawing Sheets

FIG 3

| ORIG.<br>DEST. | T3<br>dta | T2<br>dta | T1<br>a/b | T4<br>a/b | T5<br>dta |
|---|---|---|---|---|---|
| T3' | | | X | X | |
| T2' | | | X | X | |
| T1' | X | X | | | X |
| T4' | X | X | | | X |
| T5' | | | X | X | |
| UNKNOWN | (1) | (1) | (1) | (1) | (1) |

METHOD FOR ESTABLISHING DATA CONNECTIONS IN AN AUXILIARY EXCHANGE COMMUNICATIONS INSTALLATION

BACKGROUND OF THE INVENTION

The invention relates to a method for establishing data connections in an auxiliary-exchange communications installation, in which a central modem is inserted between the terminals involved in the setting up of the connection in dependence on terminals involved in a respective connection setup.

From a special edition of "Special Issue of telcom report and Siemens Magazine COM—ISDN 1985", pages 13–24, 48–72, (Order No. A 19100-L523-V849-X7600; ISBN 3-8009-3849-9) and from German Offenlegungsschrift DE 38 27 493 A1, a communications system is known to which analog and digital telephones, telefax machines, multifunctional terminals, workstation systems, personal computers, teletex and videotext stations and data terminals can be connected.

The essential component of this communications system is a central communications computer with a system data base and at least one multi-tasking operating system. A "task" unit is here understood to be an independent executive unit which consists of an executable program and its respective execution environment, for example memory allocation, device allocation. At any time, each task unit is in one of the states "active", "waiting" or "idle"; task units can run parallel with one another by means of a multi-tasking operating system and, in practice, this can take place both by means of a number of processors operating independently of one another and by means of a single processor in a time-division multiplex process. Other essential characteristics of task units are so that they can communicate with one another via messages and can synchronize each other.

The actual circuit technology of the known digital communications system is constructed modularly in such a manner that the entire system structure is based on function modules; the connection between the modules is established by means of internal system interfaces.

Such a communications system can have differently structured terminals: thus, first subscriber stations which, on the one hand, have a telephone terminal and, on the other hand, a data terminal preceded by an analog modem and a switch-over device by means of which, either the telephone terminal or the data terminal can be connected to the analog subscriber line circuit, can be connected via analog subscriber line circuits. Furthermore, second subscriber stations comprising a telephone terminal and a data terminal which is preceded by data circuit-terminating equipment, can be connected to the communications system. A separate subscriber line circuit is in each case allocated to the telephone terminal and the data circuit-terminating equipment. Finally, third subscriber stations which consist of a data terminal and a preceding data circuit-terminating equipment can be connected to the communications system. By inserting modems, this communications system provides for data links between two first, two second, two third subscriber stations, between a second a third subscriber station and data links between an internal first, second or third subscriber station and an external subscriber station with the same structure.

SUMMARY OF THE INVENTION

The object forming the basis of the invention consists in providing extended possibilities of utilization for an auxiliary-exchange communications installation of the type initially mentioned.

According to the invention, this object is achieved by the method of the present invention for producing data connections in an auxiliary-exchange communications installation, in which a central modem is inserted between the terminals involved in the setting up of the connection in dependence on terminals involved in a respective connection setup. During the setting up of a connection originating from a terminal constructed as an ISDN terminal implementing an A/B service (fax group 2, fax group 3, data via modem, vtx via modem) or of a data transmission service (64 kbit/s), this terminal forms first service indicator information in conformity with the relevant ISDN protocol, which designates the respective service. When a central modem is inserted and when a digital trunk module is connected, second service indicator information is formed for designating the service implemented on the destination side by the inserted central modem. The second service indicator information or, when the central modem is not inserted, the first service indicator information, if it designates the data transmission service, is supplied to the digital trunk module for ISDN signalling. In a further embodiment of the present invention the insertion of the central modem is activated by an ISDN terminal by means of dialling information.

The interaction of service-indicator data in conformity with the relevant ISDN protocol, formed in the installation, with the seizure of a central modem and of an exchange circuit can be considered to be essential to the invention.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 shows a table used in conjunction with the seizure of central modems.

DESCRIPTION OF THE PREFERRED EMBODIMENT

Figure 1:
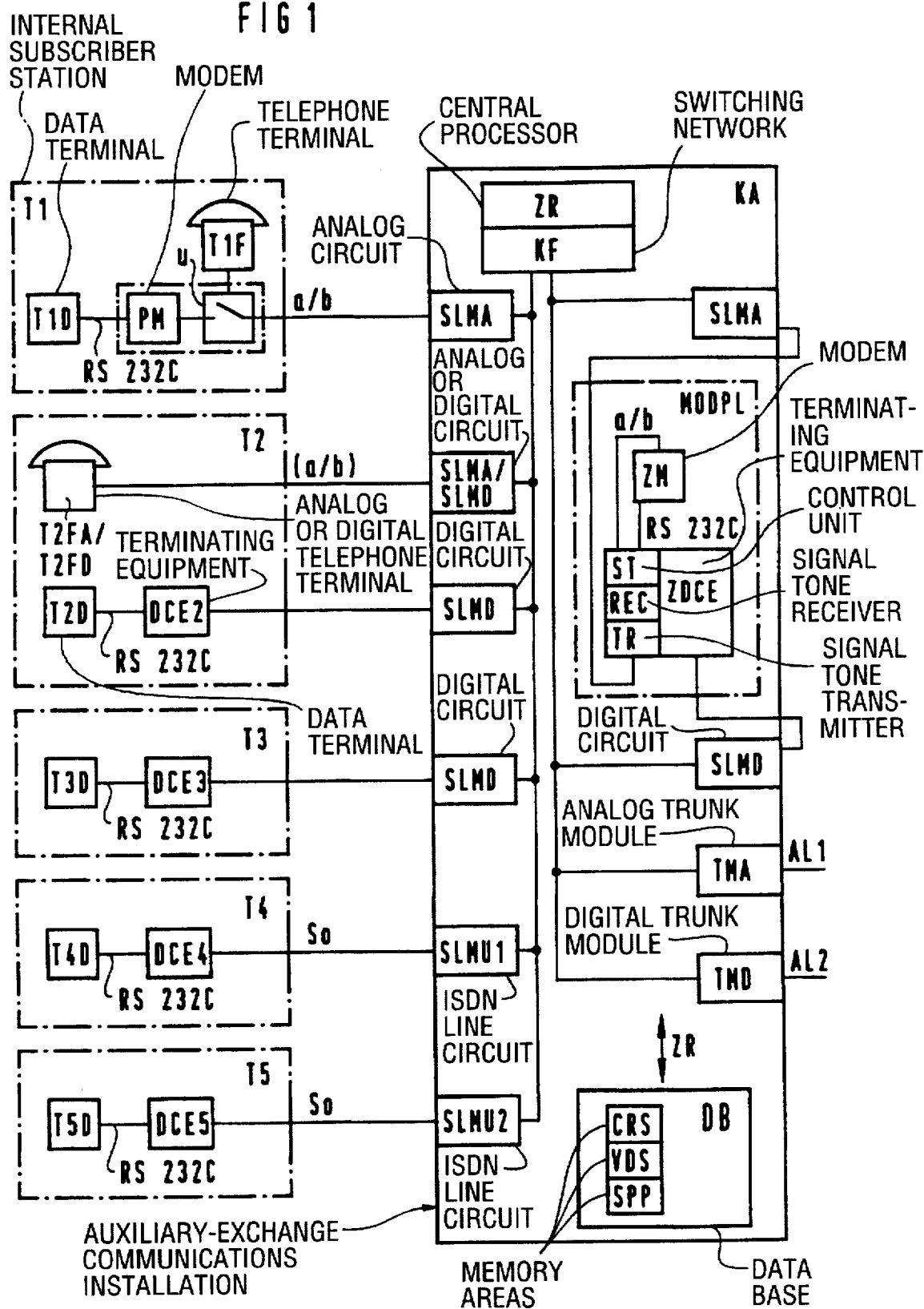
FIG. 1 shows an auxiliary-exchange communications installation according to the invention.

The auxiliary-exchange communications installation KA, shown in FIG. 1, is controlled by a central processor. This processor controls a switching network KF and establishes connections between internal subscriber stations T1, T2, T3, T4 and T5 and between an internal and an external subscriber station. The first subscriber stations T1 consist of a first telephone terminal T1F, a first data terminal T1D, a (peripheral) modem PM and of a switch-over device U. The switch-over device U can be operated manually in such a manner that either the first telephone terminal T1F or the series circuit arrangement shown in FIG. 1, consisting of the first data terminal T1D and the modem PM, can be coupled to an analog subscriber line circuit SLMA of the auxiliary-exchange communications system KA. The switch-over device U and the analog subscriber line circuit SLMA are connected to one another via an a/b wire. The interface between the first data terminal T1D and the modem DM is preferably an RS 232 C interface. The other subscriber stations T2 and T3 and the central arrangement MODPL also have the same RS 232 C interfaces.

Second subscriber stations T2 are connected to the central processor ZR of the auxiliary-exchange KA via two subscriber line circuits. A second analog or digital telephone terminal T2FA, T2FD is connected to an analog or digital subscriber line circuit SLMA, SLMD whilst a second data terminal T2D and a preceding data circuit-terminating equipment DCE2 is connected to a digital subscriber line circuit SLMD. The second telephone terminal is used for initiating the setting up of a data line to a first subscriber station T1, to an external data terminal or to T4D or T5D.

Third subscriber stations T3 consist of a series circuit of a third data terminal T3D and a data circuit-terminating equipment DCE3 which is coupled to a digital subscriber line circuit SLMD of the auxiliary-exchange communications installation KA.

Fourth subscriber stations T4 consist of a series circuit of a fourth data terminal T4D and a data circuit-terminating equipment DCE4 which is coupled to an ISDN subscriber line circuit SLMU1 of the auxiliary-exchange communications installation KA. A so-called a/b service according to ISDN protocol I TR 6 (fax group 2, fax group 3, data via modem, Vtx via modem) is implemented by a subscriber station T4.

Fifth subscriber stations T5 consist of a series circuit of a fifth data terminal T5D and a data circuit-terminating equipment DCE5 which is coupled to an ISDN subscriber line circuit SLMU2. A data transmission service according to ISDN protocol 1 TR 6 (data transmission at 64 kbit/s) is implemented by a subscriber station TS.

The installation KA exhibits further analog and digital subscriber line circuits SLMA, SLMD and, for example, analog trunk modules TMA (trunk module analog) and digital trunk modules TMD (trunk module digital). Central modems MODPL are coupled between the subscriber line circuits. The TMA, TMD modules are connected to exchange lines AL1 and AL2. The TMD modules in each case represent one ISDN basic access for ISDN exchange traffic and, if necessary, for ISDN exchange traffic (two channels at 64 kbit/s).

The central MODPL arrangements (modem pools) consist in each case of a central modem ZM and a data circuit-terminating equipment ZDCE, the data circuit-terminating equipment ZDCE being connected to a digital subscriber line circuit SLMD. Modem ZM and data circuit-terminating equipment ZDCE of the central MODPL arrangements are connected to one another via in each case one RS 232 C interface and are connected in series in the activated state, as will still be described, the modem ZM then being coupled to an analog subscriber line circuit SLMA. From this analog subscriber line circuit SLMA, an a/b wire leads to the data circuit-terminating equipment ZDCE which has a control unit ST, a signal-tone receiver REC and a signal-tone transmitter TR. The signal-tone receiver REC receives called-party tones which are transmitted from the analog modem PM of subscriber station T1 or via the exchange line AL during the setting-up of a data link, including the MODPL arrangements, to the auxiliary-exchange communications installation KA and causes the control unit ST to switch the modem ZM through to the analog subscriber line circuit SLMA when called-party tones are detected. In the switched-through state, the said series-circuit of modem ZM and data circuit-terminating equipment ZDCE is obtained in the central arrangement MODPL. In the case of a setting-up of a data link to a first subscriber station T1, which is initiated by a second or third subscriber station T2, T3 and/or a correspondingly structured external subscriber station, the signal-tone receiver REC monitors the acknowledgment tones output by the peripheral modem PM of the first subscriber station T1 and then detects ringing tones or busy tones of the called external subscriber station T1. The same applies to a data link from T2 or T3 to an external subscriber station with an analog modem.

The signal-tone transmitter TR transmits special calling-party tones to the first telephone terminal T1F of the first subscriber station T1 in data links which are either set up from this first subscriber station T1 to a second or third subscriber station T2, T3 or in the reverse direction. The special signal tones indicate in the first subscriber station T1 that the switch-over device U is to be operated in such a manner that the first telephone terminal T1F is disconnected from the analog subscriber line circuit SLMA associated with the first subscriber station T1 and the arrangement of first data terminal T1D and peripheral modem PM is connected to this analog subscriber line circuit SLMA (insertion of MODPL).

All subscriber line circuits SLMA, SLMD, SLMU1 and SLMU2 are connected to the central processor ZR via the switching network KF. This processor is also connected to a data base DB in which, preferably, first memory areas CRS are provided for accommodating connection-relevant data for the period of the connection, separate second memory areas VDS for accommodating in each case—volatile—data which are only relevant during an exchange of messages and third memory areas SPP for accommodating system configuration data including the configuration of subscriber stations T1, T2, T3, T4, T5, and data describing the central MODPL arrangements.

Each central MODPL arrangement can comprise a number of identical modems ZM and equipment ZDCE in order to provide for a number of data links between subscriber stations T1, T2, T3, T4 and T5 at the same time. In addition, the auxiliary-exchange communications installation KA can exhibit a number of physically different central arrangements MODPL, especially when the data terminals T1D, T2D, T3D, T4D, T5D and external data terminals, to be connected, operate at different data transmission rates. Each MODPL arrangement then contains one or, respectively more identical modem-pool-specific central modems ZM and associated equipment ZDCE.

The analog modems PM and ZM involved in a particular data link exhibit the same transmission characteristics and therefore have the same performance at the respective analog interface to SLMA. Commercially available two-wire modems such as, for example, the modems by the US company Bell with product names 103 and 2025 or quite generally modems which fulfill the requirements of CCITT recommendations V.21, V.22, V.22 bis, V.23, V.26 bis and V.27 ter, can be used as modems PM and ZM.

The data circuit-terminating equipment DCE2, DCE3, DCE4, DCE5 and ZDCE involved in a particular data link exhibit the same transmission characteristics and thus have the same performance at the respective digital interface to SLMD and, respectively, SLMU1, SLMU2. DCE2, DCE3 and ZDCE correspond to CCITT recommendations X.15. DCE2 and DEC3 have the function of data circuit-terminating equipment whilst ZDCE has the function of a data terminal. The DCE2 and DCE3 facilities in each case correspond to a known "terminal adapter" which adapts an RS 232 C data interface to an ISDN interface (So). The DCE4 equipment is an ISDN adapter a/b and the DCE5 equipment can form an ISDN-V24 interface (product by Siemens: "DCI 631, S30122-U5075-X").

The ZDCE equipment has the same circuit as the DCE2 and DCE3 equipment but also exhibits the control unit ST, the signal-tone receiver REC and the signal-tone transmitter TR as additional components.

Figure 2:
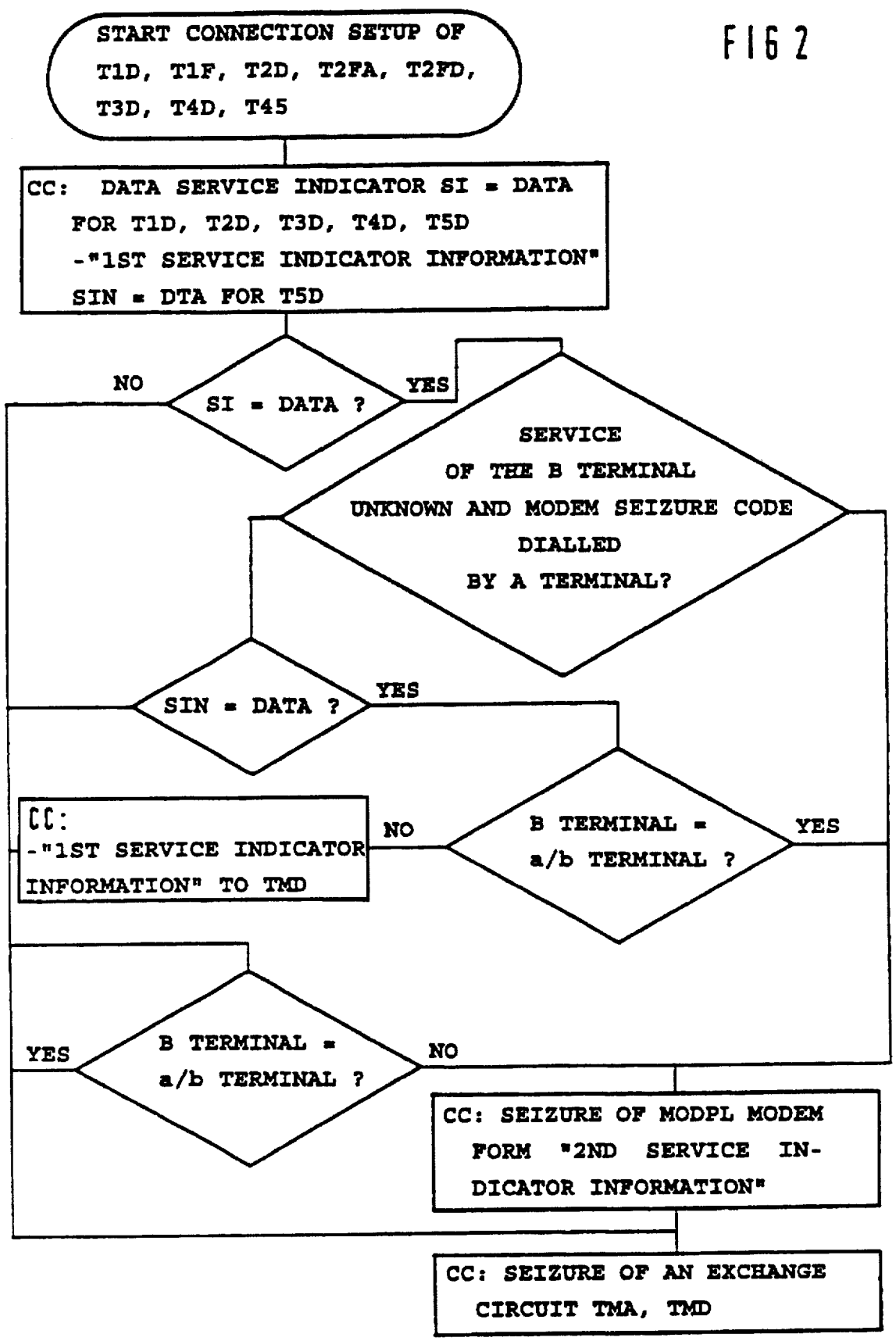
FIG. 2 shows a flow chart with the method steps for seizing central modems and exchange circuits.

As shown in FIG. 2 in the form of a flow chart, the procedures in connection with the modem and exchange-circuit seizure after the initiation of the setting-up of a connection by one of the internal terminals begin with a check whether the connection to be established is a data link. In the auxiliary-exchange communications installation shown in FIG. 1, data links are established by T1D, T2D, T3D, T4D and T5D. For a connection setup initiated by an internal data terminal T1D, T2D, T3D, T4D, T5D, a data service indicator SI=DATA is formed and for a connection setup initiated by an ISDN terminal T5D an additional service indicator information SIN=DTA ("1st service indicator information") is formed.

If no data link is to be established, an exchange circuit TMA or TMD is seized directly depending on whether the terminal T1F, T2FA; T2FD initiating the connection setup is an analog terminal or a digital terminal.

If, in contrast, a data link is to be established (SI=DATA), dialing information items are used for checking whether the service (a/b service or data service) of the B terminal is unknown and whether the internal subscriber station has dialed a modem seizure code which initiates the connection setup.

If this is so, the dialed modem is seized if one is available.

If the last-mentioned check leads to a negative result, a further check is made whether the (A–) terminal setting up the connection is a data terminal for which the first service indicator information SIN=DTA has been formed. If this is confirmed, a further check is made whether the terminal to which the connection is to be set up is an a/b terminal. If this is confirmed, an MODPL modem is seized; if not, an exchange circuit TMD is seized and the first service indicator information already formed is supplied to the exchange circuit.

If the last check but one ("Is A terminal a data terminal with SIN=DTA?") leads to a negative result, a check is made whether the B terminal is an a/b terminal. If this check leads to a negative result, a central MODPL modem is first seized and following this, an exchange circuit is seized; if, however, this check leads to a positive result, an exchange circuit TMA or TMD is immediately seized.

If an MODPL modem is seized, the controller CC forms a second service indicator information which designates the service (a/b or 64 kbit/s data transmission) implemented on the destination side by the inserted central modem. The first and the second service indicator information corresponds to the service indicator according to ISDN protocol I TR 6 (compare 1 TR 6, table 3-84: coding of the service indicator).

Table 3 shows a table which specifies, in dependence on internal A terminals ("orig.") T1 . . . T5 and internal B terminals ("Dest"). T1 . . . T5 or, respectively, external B terminals T1' . . . T5' of the same structure, the cases in which a central modem is inserted ("X"). If the structure, that is to say the service of an external B terminal is unknown to the auxiliary-exchange communications installation ("(1)" in FIG. 3), a modem is seized when a modem seizure code has been dialled by the A terminal.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed:

1. A method for producing data connections in an auxiliary-exchange communications installation, comprising:

providing and inserting a central modem between terminals involved in a setting up of a connection in dependence on terminals involved in a respective connection setup;

forming in a first terminal, during a setting up of a connection originating from the first terminal that is constructed as an ISDN terminal implementing an A/B service or a data transmission service, first service indicator information in conformity with a relevant ISDN protocol, which designates the respective service;

when the central modem is inserted and when a digital trunk module is connected, second service indicator information is formed for designating the service implemented on the destination side by the inserted central modem; and supplying the second service indicator information or, when the central modem is not inserted, the first service indicator information, if it designates the data transmission service, to the digital trunk module for ISDN signalling.

2. The method as claimed in claim 1, wherein the method further comprises activating the insertion of the central modem by an ISDN terminal by dialling information.

* * * * *